June 17, 1924.
J. H. IGO
1,498,038
AUTOMOBILE BUMPER
Filed Feb. 12, 1923
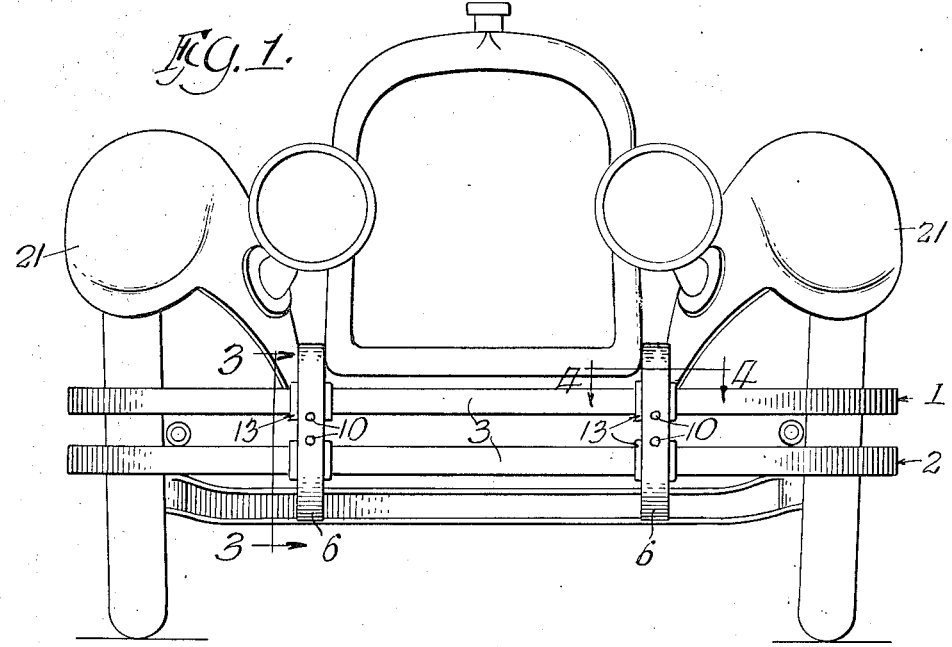
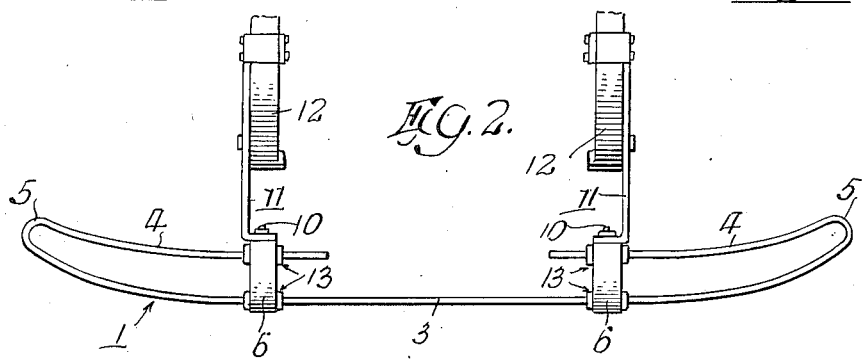
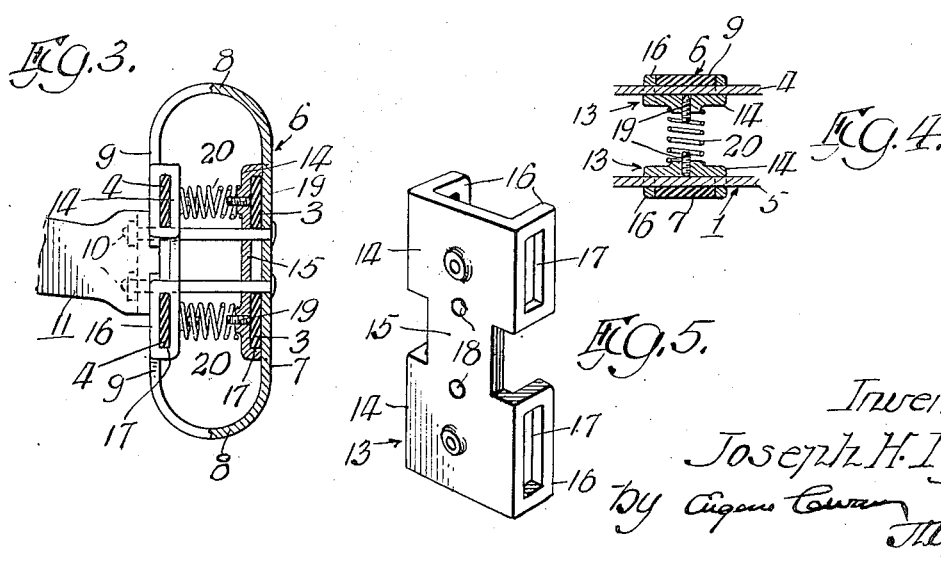
Inventor
Joseph H. Igo Patented June 17, 1924.

1,498,038

UNITED STATES PATENT OFFICE.

JOSEPH H. IGO, OF CHICAGO HEIGHTS, ILLINOIS, ASSIGNOR TO IGO MANUFACTURING CO., OF CHICAGO, ILLINOIS.

AUTOMOBILE BUMPER.

Application filed February 12, 1923. Serial No. 618,488.

*To all whom it may concern:*

Be it known that I, JOSEPH H. IGO, a citizen of the United States, residing at Chicago Heights, in the county of Cook and State of Illinois, have invented new and useful Improvements in Automobile Bumpers, of which the following is a specification.

This invention relates to bumpers for automobiles and other motor vehicles.

Bumpers have predetermined lengths and the fixtures heretofore used for connecting them with the car do not permit bodily endwise adjustment of the bumpers with respect to the fixtures to secure proper alignment with the sides of the car, with the result that in some installations the bumpers at one end project too far beyond the sides of the car and are likely to be hooked by a passing machine with the chance of accident and damage, as obvious.

The main object of my invention is to provide a mounting whereby the bumpers may be adjusted bodily endwise so that their ends may be aligned properly with the sides of the car and thus prevent the bumpers projecting too far beyond the sides of the car to cause accidents, as heretofore.

The invention consists further in the matters hereinafter described and more particularly set forth in the appended claims.

In the accompanying drawings—

Fig. 1 is a front view of an automobile and showing applied thereto a bumper construction of my invention;

Fig. 2 is a top plan view of said bumper means;

Fig. 3 is a vertical sectional view taken on line 3—3 of Fig. 1;

Fig. 4 is a horizontal sectional view taken on line 4—4 of Fig. 1; and

Fig. 5 is a perspective view of one of the adjustment blocks to be hereinafter decribed.

The bumper construction of my invention has bumper means which, when in the form shown in the drawings, includes two horizontally arranged bumper bars 1, 2. These are vertically spaced apart, as shown, and each bar is preferably made from a continuous length of flat spring steel having a front section 3 and two end sections 4, 4. The latter are bent over from the front section and lie to the rear thereof. This connects the front section 3 with its end sections 4 by integral loop shaped end parts 5, 5, which constitute the ends of the bumper bars.

The bars 1, 2 pass through vertical guard members 6, 6. Each guard member 6 is made from a continuous strip of flat spring steel and is bent to provide a vertical front section 7, loop shaped end sections 8, 8, and rear sections 9, 9. The latter are located to the rear of the front section 7 and have their ends terminating short of each other, as shown in Fig. 3. The ends of the rear sections 9 are secured by bolts 10, 10 to an associated bracket 11, which reaches to the aligned side frame member 12 of the automobile chassis and is secured thereto in any suitable manner to hold the bumper in place. The vertical guards 6, 6 are in substantial alignment with the side members 12, 12 of the automobile frame and, as shown in Fig. 1, extend above and below the bars 1, 2 so as to prevent the bumper of another machine passing either over or under the bars 1, 2 in the event of a collision.

To permit endwise or longitudinal adjustment of the bars 1, 2, I provide for the front and rear sections 3, 4 of each bar at each of the vertical guards 6 a block 13, such as shown in perspective in Fig. 5. As there illustrated, said block 13 is divided into upper and lower sections 14, 14 by a midweb 15. This has a width substantially equal to that of the associated section of the vertical guard 6. The upper and lower sections 14, 14 of the block 13 have side flanges 16 at right-angles to the web 15, and arranged to straddle the adjacent vertical section of the associated guard 6. Said flanges 16, 16 have vertical slots 17 of a length and width to allow the bar sections to slide therethrough.

As shown in Fig. 3, there is a block 13 for each of the rear sections 4 of the bars 1, 2, and these blocks engage the inside of the rear sections 9 of the guards 6. Similarly, there are blocks 13 for the front sections 3 of the bumper bars and such blocks engage the front section 7 of the guards on the inside. The bolts 10 pass through bolt holes 18 in said blocks and also through the front sections 7 of the guards 6 to hold the blocks in place. These bolts clear the engaged sections of the bumper bars so as not to prevent adjustment of them when desired. The upper and lower sections of each block 13 are provided on the inside with set screws 19 designed to be impinged against the associated sections of the bumper bars to hold them in place. Coiled springs 20 are located between the front and rear blocks 13 at the guards 6 and resiliently hold them apart.

Automobiles of the same make, as well as of the various makes, vary in width across the front. When equipped with a bumper means of my invention, the bars 1, 2 are not fixed in position by the brackets 11, but may be adjusted endwise to line up their ends 5, 5 with the sides of the car; that is, to bring their ends at proper positions with respect to the front fenders 21, 21. This is done by loosening the set screws 19 of the several blocks 13 and then sliding the bars 1, 2 endwise to the extent required. The rear sections 4 of the bars have their inner ends extending inward beyond the guards 6. Thus the bars 1, 2 can be adjusted without releasing their rear sections 4 from the rear blocks 13. When proper adjustment is had, the bars are clamped in their adjusted positions by the set screws 19.

The distance between the coils of the spring 20 is such that a relatively narrow spanner wrench may be readily inserted to reach the set screws 19 for turning them. The structure described permits adjusting the bumper bars 1, 2 endwise within limits, without disturbing the connection of the brackets 11, 11 with the frame 12, 12 of the car, so that proper centering of the bumper bars on the car may be had.

While I have shown and described herein in detail a bumper construction embodying the features of my invention, it is of course to be understood that the details of construction and arrangement of parts may be variously changed and modified without departing from the spirit and scope of my invention.

I claim as my invention:

1. An automobile bumper construction, comprising a horizontal bumper bar, vertical guard members intermediate the ends of said bar and extending above and below the same, blocks carried by said guard members and having slots for the bar to slide therethrough for endwise adjustment, means for clamping the bar to said blocks, and means included in the bumper construction for attaching the same to an automobile.

2. An automobile bumper construction, comprising a horizontal bumper bar having joined front and rear sections, vertical guard members intermediate the ends of said bar and having front and rear sections outside of the corresponding sections of said bar, blocks carried by said guard members on the inside thereof and having slots for the bar sections to slide therethrough for endwise adjustment, and brackets carried by said guard members for attaching the bumper construction to an automobile.

3. An automobile bumper construction, comprising a horizontal bumper bar, vertical guard members intermediate the ends of said bar, blocks carried by said guard members and having side flanges to engage over the sides of said guard members, said flanges having slots therein to receive said bar and permit endwise adjustment thereof, means for clamping the bar to said blocks, and brackets secured to said guard members for attaching the bumper construction to an automobile.

4. An automobile bumper construction, comprising a horizontal bumper bar made of a continuous strip of metal and having its end sections bent to the rear of its front section, the ends of said rear sections being opposed but terminating short of each other, vertical guard members intermediate the ends of said bar and being bent to have front and rear sections joined by looped sections above and below said bar, said bar having its sections extending through said guard members, front and rear blocks carried by said guard members against the inside of the sections thereof, said blocks having slots therein for the front and rear sections of the bar to slide therethrough for endwise adjustment of said bar, means carried by said blocks for clamping the bar sections thereto, and brackets carried by said guard members for attaching the bumper construction to an automobile.

5. An automobile bumper construction, comprising a plurality of horizontal bumper bars arranged one above the other, vertical guard members intermediate the ends of said bars and extending above and below the latter, blocks carried by said guard members and having slots therein to receive all of said bars and permit the latter to slide therethrough for endwise adjustment, means for clamping said bars to said blocks, and means included in the bumper construction for attaching the same to an automobile.

6. An automobile bumper construction, comprising a plurality of horizontal bumper bars arranged one above the other, vertical guard members intermediate the ends of said bars and extending above and below the latter, said guard members having upright front and rear sections spaced apart horizontally and connected together above and below said bars, means for holding said bars at the front sections of said guard members, and attaching brackets included in the bumper construction.

7. An automobile bumper construction, comprising a plurality of horizontal bumper bars arranged one above the other, vertical guard members intermediate the ends of said bars and extending above and below the latter, said guard members having upright front and rear sections spaced apart horizontally and connected together above and below said bars, spring means for yieldably holding said bars against the front sections of said guard members, said spring means extending between said bars and the rear sections of said guard members, and attaching brackets included in the bumper construction.

8. An automobile bumper construction, comprising a plurality of horizontal bumper bars arranged one above the other, vertical guard members intermediate the ends of said bars and extending above and below the latter, said guard members having upright front and rear sections spaced apart horizontally and connected together above and below said bars, spring means for yieldably holding said bars against the front sections of said guard members, said spring means extending between said bars and the rear sections of said guard members, and attaching brackets secured to the rear sections of said guard members.

In testimony that I claim the foregoing as my invention, I affix my signature this 27th day of November A. D. 1922.

JOSEPH H. IGO.